United States Patent [19]

Cargill

[11] Patent Number: 5,236,072
[45] Date of Patent: Aug. 17, 1993

[54] DOCUMENT SIZE DETECTION DEVICE

[75] Inventor: N. Allen Cargill, Warminster, Pa.

[73] Assignee: Technitrol, Inc., Philadelphia, Pa.

[21] Appl. No.: 616,187

[22] Filed: Nov. 20, 1990

[51] Int. Cl.$^5$ .............................................. G07F 7/04
[52] U.S. Cl. .................................... 194/207; 271/227; 209/534; 209/586
[58] Field of Search ........................ 194/207, 212, 334; 209/534, 586; 271/227, 228

[56] References Cited

U.S. PATENT DOCUMENTS

| | | | |
|---|---|---|---|
| 3,731,799 | 5/1973 | Meloni et al. | 194/207 X |
| 3,918,586 | 11/1975 | Tyler et al. | 209/586 |
| 3,939,954 | 2/1976 | Collins | 194/334 X |
| 4,136,780 | 1/1979 | Hunter et al. | 209/586 X |
| 4,267,916 | 5/1981 | Black et al. | 194/334 X |
| 4,326,636 | 4/1982 | Kawakami | 209/534 |
| 4,435,834 | 3/1984 | Pauli et al. | 194/206 X |
| 4,487,306 | 12/1984 | Nao et al. | 194/207 |
| 4,749,076 | 6/1988 | Akagawa et al. | 194/207 |

FOREIGN PATENT DOCUMENTS

| | | | |
|---|---|---|---|
| 52-60190 | 5/1977 | Japan | 194/207 |
| 2176038 | 12/1986 | United Kingdom | 194/334 |

Primary Examiner—Michael S. Huppert
Assistant Examiner—William M. Hienz
Attorney, Agent, or Firm—John F. A. Earley; John F. A. Earley III

[57] ABSTRACT

A document size detection device for detecting the size of documents such as non-U.S. currency comprises a housing, a plate mounted in the housing past which each document is moved, and detectors positioned along the plate for sensing the size of each document and for initiating a signal indicating the size of each document.

3 Claims, 3 Drawing Sheets

DOCUMENT SIZE DETECTION DEVICE

BACKGROUND OF THE INVENTION

1. Field of the Invention

This invention relates to devices for detecting the size of documents, and more particularly concerns document size detection devices for identifying the size, and therefore the value denominations of paper currency bank notes, where the bank notes have different lengths and/or widths which correspond to different value denominations as in many countries outside the United States.

2. Description of the Prior Art

Machines handle documents such as currency, checks, food stamps, coupons, and the like at speeds generally in the range of 10 to 150 inches/second. The machines are used for counting, batching, imprinting, reading, sorting, dispensing, etc. The documents are rectangularly shaped sheets which are fed along either of its two axes.

Mixed documents, such as a mixture of German DM notes of different value denominations and different sizes, are difficult to count by machine, such as a counting machine disclosed in U.S. Pat. No. 4,737,627, issued on Apr. 12, 1988, column 3, line 12, to column 4, line 3, of which and FIG. 1 of which are incorporated herein by reference.

SUMMARY OF THE INVENTION

It is an object of this invention to provide a device and a method for detecting the value of bank notes when the bank notes have different lengths and/or widths which correspond to different value denominations, and for counting a stack of bank notes and determining their total value.

Another object of the invention is to provide a device and a method for detecting the size of documents.

These and other objects are accomplished by providing a housing, a plate mounted in the housing past which each document is moved, and sensor means positioned along the plate for sensing the size of each document and for initiating a signal indicating the size of each document.

The present invention detects and identifies the size of each document in a mixture of different size documents as each document moves over the detection area of the invention moving within a speed range of slow to very fast.

In its simplest form, the invention detects, for example German DM notes moving along their short axis, or width. LED/sensor pairs are placed along the path of the moving documents to detect each of the six different German DM notes

BRIEF DESCRIPTION OF THE DRAWINGS

FIG. 1b is a view in cross section taken along the lines and arrows 1b—1b of FIG. 1a;

FIG. 1c is a view in cross section taken along the lines and arrows 1c—1c of FIG. 1a;

DETAILED DESCRIPTION

Figure 1A:
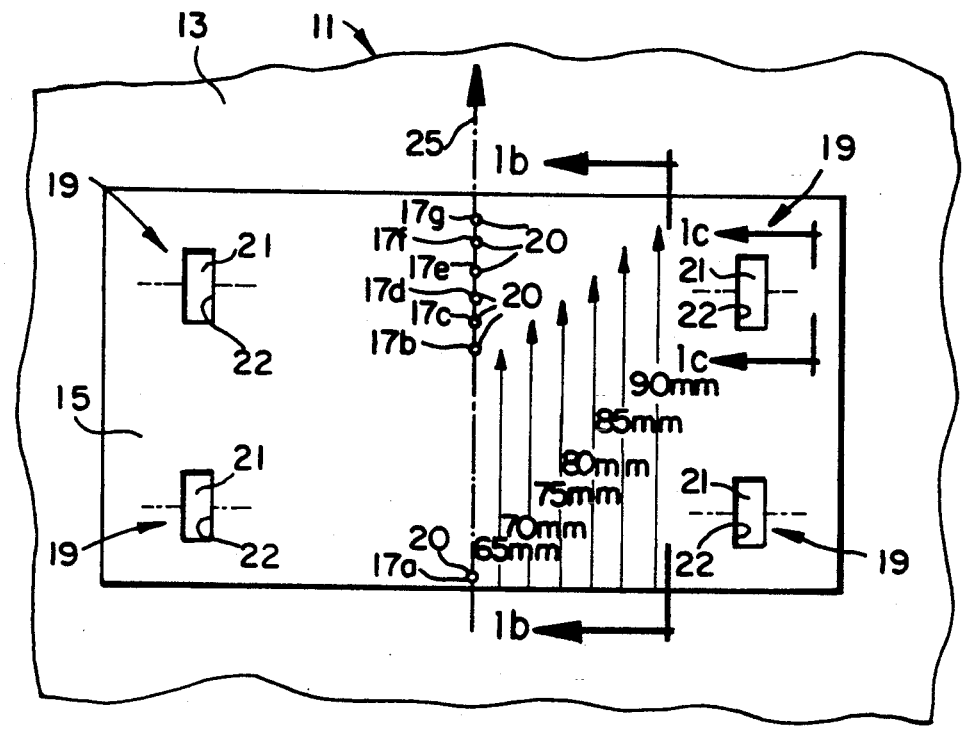
FIG. 1a is a view in top plan of the detection area of the invention.

Turning now to the drawings, there is shown in FIG. 1a a device 11 housed in a counting machine for detecting the size of German DM notes and for identifying their value denominations. Device 11 comprises a housing 13, a plate 15 mounted in housing 13 past which each note is moved, and sensor means 17 positioned along plate 15 for sensing the size of each note and for initiating a signal indicating the size of each note. Since the size of each German DM note corresponds to a specific value denomination, each signal indicating a note size also indicates the value denomination of that note.

Sensor means 17 includes a trailing edge detector 17a for detecting the trailing edge of each note as each note passes over plate 15.

Sensor means 17 also includes detector 17b, 17c, 17d, 17e, 17f, and 17g that are spaced in a pattern along plate 15 such that a different designated number of detectors 17b–17g which are covered or uncovered by each note corresponds to different designated size of notes. For example, a note that covers only detector 17b after the railing edge of the note passes over detector 17a is 65 mm and corresponds to a 10 German DM note. If detector 17b and 17c are covered when the trailing edge of the note passes over 17a, a 70 mm sheet is identified, which corresponds to a 20 German DM note. If detector 17b, 17c, and 17d are covered when the trailing edge of the note passes over detector 17a, a 75 mm sheet is identified which corresponds to a 50 German DM note. If detectors 17b–17e are covered by the note when the trailing edge of the note passes over detector 17a, a 80 mm sheet is identified, which corresponds to a 100 German DM note. If detectors 17b–17f are covered when the trailing edge of the note passes over detector 17a, a 85 mm sheet is identified, which corresponds to a 500 German DM note. If detectors 17b–17g are covered by the note when the trailing edge of the note passes over detector 17a, a 90 mm sheet is identified, which corresponds to a 1000 German DM note.

Figure 1B:
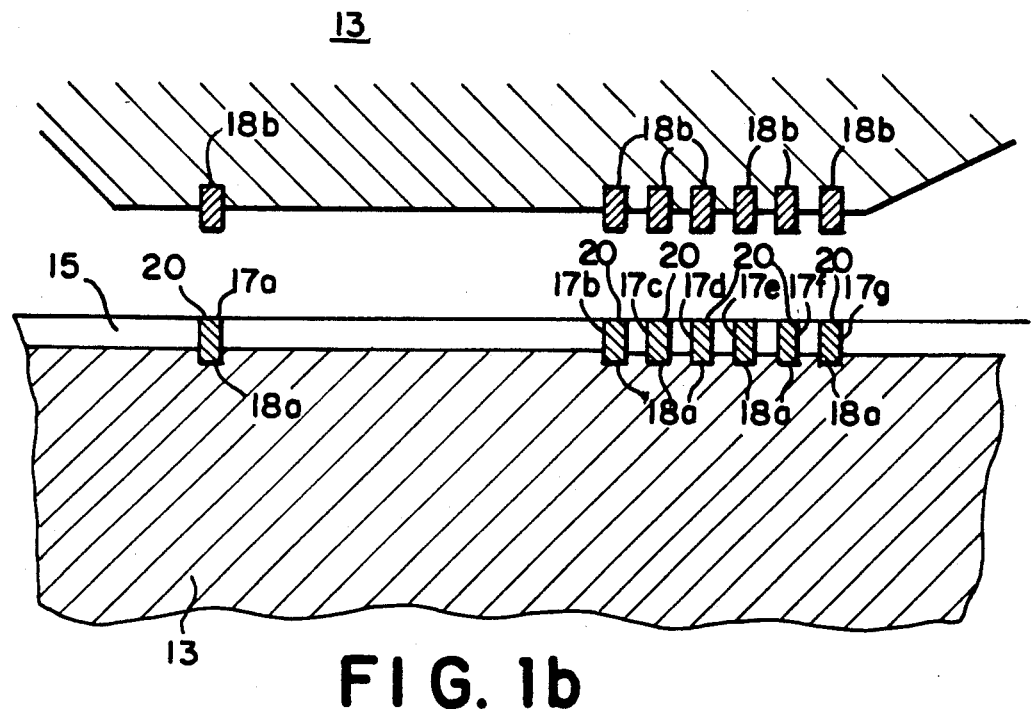

As shown in FIG. 1b, each detector 17a–17g includes an LED/sensor pair 18 positioned normal to the plane of movement of the notes as notes pass over plate 15. As shown in FIG. 1b, the first half 18a of each LED/sensor pair 18 of detector 17a–17g is mounted in openings 20 formed in plate 15, and the second half 18b of each LED/sensor pair 18 of detector 17a–17g is mounted on housing 13 above plate 15 and across from the corresponding first half 18a.

Figure 1C:
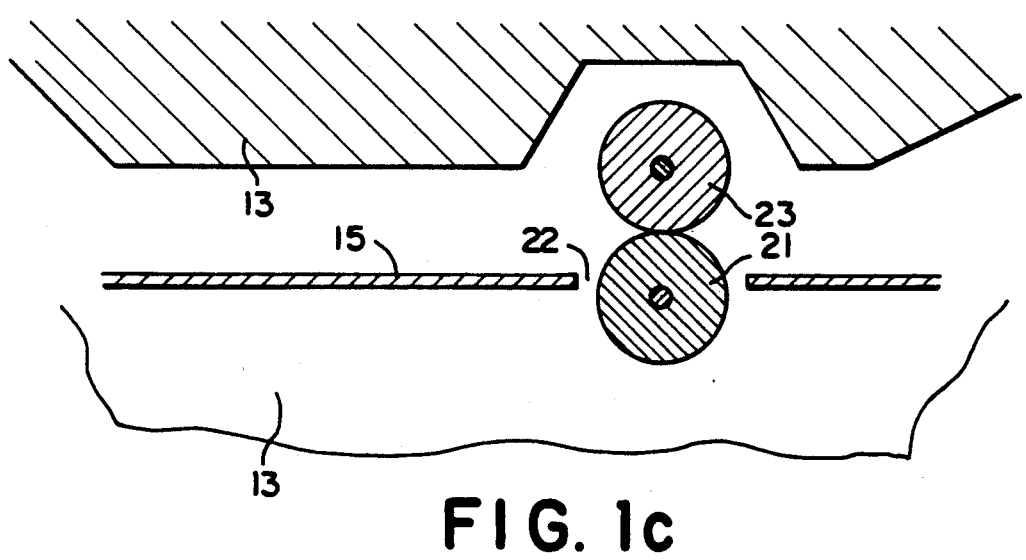

Conveying means 19 is mounted along plate 15 for conveying each note over plate 15. Referring to FIGS. 1a and 1c, conveying means 19 includes a plurality of driven rollers 21 mounted below plate 15 so as to project above plate 15 through holes 22, and driven rollers 21 are paired with idler rollers 23 mounted above and in contact with the top surface of driven rollers 21.

Control of each note as it is conveyed over plate 15 is maintained by the placement of the driven roller 21-idler roller 23 pairs. Both the right side portion and the left side portion of each note as it passes over the detection area plate 15 is in contact with a driven roller 21-idler roller 23 pair. By maintaining control of the notes as they are conveyed over the detection area, skew of the notes as they pass over plate 15 is minimized.

In operation, German DM notes are fed width-wise into document size detection device 11 in the direction of the arrow 25 in FIG. 1a, and each note is conveyed over plate 15 by the rollers 21, 23. When the trailing edge of each note passes beyond trailing edge detector 17a so that the note no longer covers trailing edge detector 17a, the size of the note is detected by the sensor means 17 by determining the number of width detectors 17b–17g that are covered or uncovered. The width detectors 17b–17g are spaced such that the number of covered or uncovered detectors provides the identity of the note. The following table summarizes the detection of different notes.

| Width Detector Covered | Width of Note Detected | Identity of Denomination |
| --- | --- | --- |
| 17b | 65 mm | 10 DM note |
| 17b-17c | 70 mm | 20 DM note |
| 17b-17d | 75 mm | 50 DM note |
| 17b-17e | 80 mm | 100 DM note |
| 17b-17f | 85 mm | 500 DM note |
| 17b-17g | 90 mm | 1000 DM note |

Device 11 detects and identifies the size of each note passing over the detection area, and the notes may be all one size or may be a mixture of different sizes.

When the trailing edge passes over detector 17a, sensor means 17 senses the size of each note passing over it by sensing the number of detectors 17b–17g that are covered when detector 17a becomes uncovered, and initiates a corresponding signal indicating the size of the note. The signal is sent to a control mechanism where each signal, which indicates the specific size and corresponding denomination of the detected note, is registered. Using appropriate counting means, these signals are counted to determine the total value of the notes fed through device 11.

When the notes are moved through the detection area on plate 15, they are separated from one another so that there is a space between each note larger than the distance between the width detector 17b and the width detector 17g.

The notes are moved over plate 15 within the speed range of slow to very fast, such as from 10 inches per second to 150 inches per second.

Figure 2A:
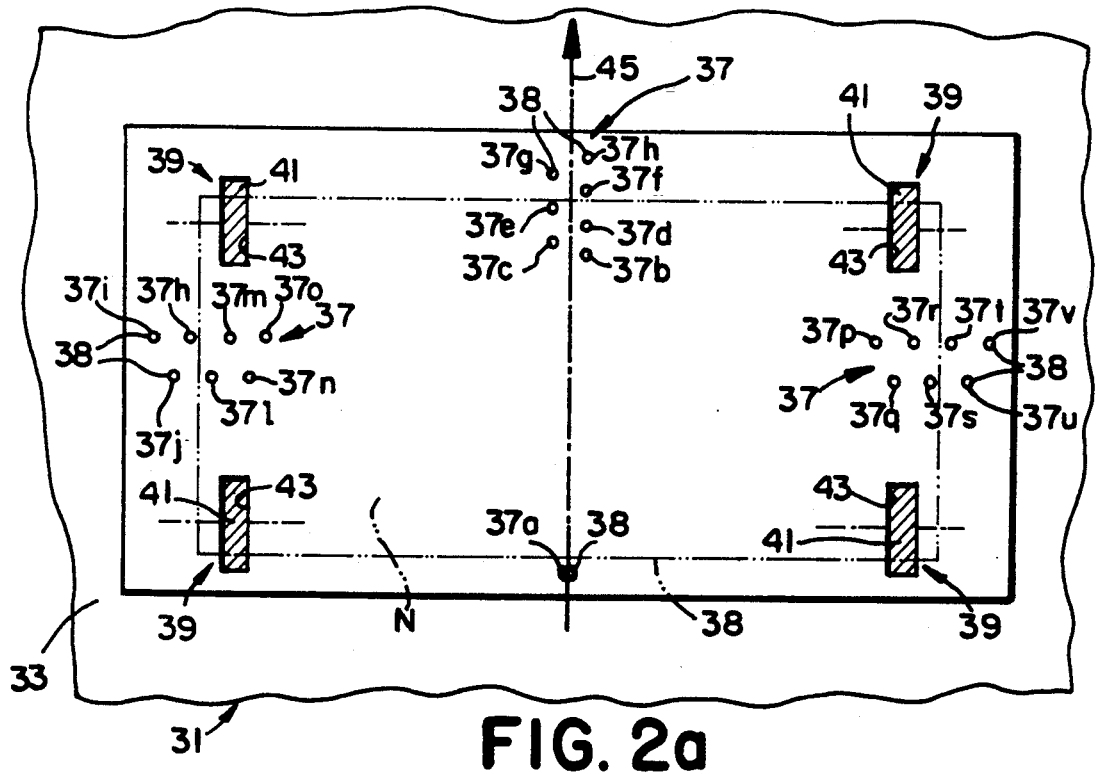
FIG. 2a is a view in top plan of the detection area of another embodiment of the invention.

Turning to FIG. 2a, an alternative embodiment of the invention is shown which comprises a device 31 for detecting the size of documents such a paper currency notes N which have different lengths or different widths or different lengths and widths which correspond to different value denominations, and for identifying their value denominations. Device 31 comprises a housing 33, a plate 35 mounted in housing 33 past which each note is moved, and sensor means 37 positioned in plate 35 for sensing the size of each note and for initiating a signal indicating the size of each note.

Sensor means 37 include a trailing edge detector 37a for detecting the trailing edge 38 of each note N as each note passes over plate 35. Sensor means 37 also include width detectors 37b, 37c, 37d, 37e, 37f, 37g, and 37h that are spaced in a pattern along plate 35 such that the number of width detectors 37b–37h covered or uncovered by each document corresponds to different designated widths of notes.

Sensor means 37 also includes a plurality of length detectors 37i, 37j, 37k, 37l, 37m, 37n, 37o, 37p, 37q, 37r, 37s, 37t, 37u, and 37v, spaced in a pattern along plate 35 such that the number of length detectors 37i–37v that are covered or uncovered by each note corresponds to a different designated length of the notes.

Width detectors 37b–37h and length detectors 37i–37v are staggered in this embodiment of the invention, as shown in FIG. 2a, to sense notes which have a size change of smaller degree than the German DM notes, that is, to detect, for example, currency which has a size change of only 3 mm between notes, such as the widths of some Australian currency.

Like detectors 17a–17g of the first embodiment, detectors 37a–37v comprise LED/sensor pairs positioned normal to the plane of movement of the notes as the notes pass over plate 35, with the first half of each LED/sensor pair mounted in openings 38 formed in plate 35 and the corresponding second half of each LED/sensor pair mounted in housing 33 above plate 35 across from its first half.

The placement of detectors 37a–37v takes into account some skew in the notes as they pass over plate 35, but skew in minimized by keeping the notes under control via conveying means 39 as the notes are moved through the detection area.

Conveying means 39 is mounted along plate 15 for conveying each note over plate 35. Conveying means 39 includes a plurality of driven rollers 41 mounted below plate 35 so as to project above plate 15 through holes 43, that are paired with idler rollers (not shown) mounted above and in contact with the top surface of driven rollers 41.

Control of each note as it is conveyed over plate 35 is maintained by the placement of the driven roller 41-idler roller pairs. Both the right side portion and the left side portion of each note as it passes over the detection area plate 15 are in contact with a driven roller 21-idler roller pair.

In operation, bank notes are fed width-wise sequentially into device 31 over plate 35 in direction of the arrow 45 in FIG. 2a, and each note N is conveyed over plate 35 by the rollers. When the trailing edge 38 of each note N passes beyond trailing edge detector 37a so that the note N no longer covers trailing edge detector 37a, the size of the note is detected by the sensor means 37 by determining the number of width detectors 37b–37h and the length detectors 37i–37v that are covered or uncovered. Detectors 37b–37v spaced such that the number of width detectors 37a–37h and length detectors 37i–37v that are covered provide the identity of the note. The number of detectors covered determines the size and therefore the identity of the bank note.

Device 31 detects and identifies the size of each note passing over the detection area, and the notes may be all one sizes or may be mixture of different sizes. Detectors 37a–37v sense the size of each note passing over them by sensing the number of detectors 37b–37v that are covered when detector 37a becomes uncovered and initiate a corresponding signal indicating the size of the note. The signal is sent to a control mechanism where each signal, which indicates the specific size and corresponding denomination of the detected note, is registered. Using appropriate counting means, the signals are counted to determine the total value of the notes fed through device 31.

Figure 2B:
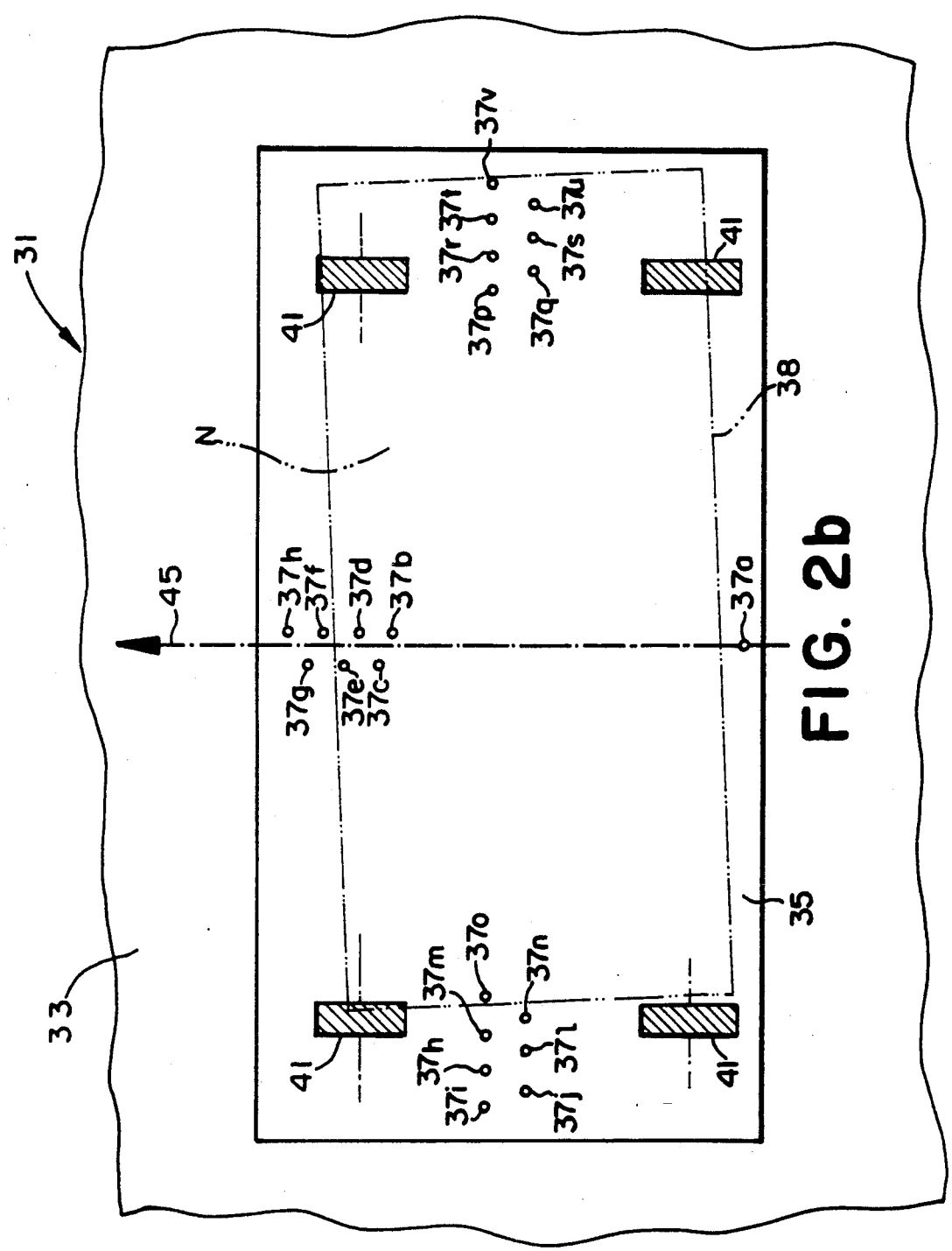
FIG. 2b is a view in top plan of the detection area of the invention shown in FIG. 2a, showing a document that has been shifted to the right being processed.

In device 31, as shown in FIG. 2a, when the trailing edge 38 of note N is detected by trailing edge detector 37a, there are 12 detectors 37b, 37c, 37d, 37d, 37e, 37l, 37m, 37n, 37o, 37p, 37q, 37r, and 37s covered by note N. However, as shown in FIG. 2b, if a similar size note is fed over plate 35, but, for example, it is shifted and skewed to the right, the correct size of the note is still detected since 12 of the width and length detectors—detectors 37b-37e and detectors 37o-37v —still remain covered by the note.

Again, when the notes are moved through the area of detection along plate 15, the notes are separated from one another so that there is a space between each note larger than the detection area.

The distance between the trailing edge detector 37a and the detector 37b is less than the width of the note having the smallest width of the notes being processed so that, when the trailing edge detector 37a is uncovered, the note covers detector 37b.

The notes are moved through device 31 within the speed range of slow to very fast, such as from 10 inches per second to 150 inches per second.

Although paper currency has been used to illustrate the invention, any type of documents may be processed with the inventive document size detection device.

EXAMPLE USES

Devices 11 and 31 may be used to verify that a batch of documents contains sheets all having the same size. For example, a batch of German 50 DM notes may be processed through either device 11 or 31 to have each document identified to verify that each document in the batch is in fact a German 50 DM note. If a note other than a German 50 DM note is contained in the batch, such as a German 10 DM note, device 11 and device 31 identify the non-conforming note (the German 10 DM note contained in the batch of German 50 DM notes), and stops processing the batch so that the non-conforming note (the German 10 DM note) may be removed from the batch.

Devices 11 and 31 may be used to process a batch of documents containing notes of different sizes. The mixed batch of documents may be processed through devices 11 and 31 such that the number of each document of a particular size is identified and counted. For example, a mixed batch of German DM notes containing German 20 DM notes, German 50 DM notes, and German 100 DM notes may be processed through either device 11 or device 31 so that the number of each German 20 DM note in the mixed batch is identified and counted, the number of German 50 DM notes is identified and counted, and the number of German 100 DM notes in the mixed batch is identified and counted. Further, the total monetary value of the mixed batch may be counted based on the signals sent to a counting mechanism from the device 11 or device 31.

Devices 11 and 31 also may be hooked-up to a sorter such that as devices 11 and 31 sense the size of each document in a mixed batch of documents being processed through devices 11 and 31, a signal is transmitted to a sorter downstream from the devices 11 and 31 which sorts the documents by size. For example, a mixed batch of German DM notes containing German 50 DM notes and German 100 DM notes may be processed through device 11 or device 31 such that each size note is identified as it moves over the detecting plate 15 or 35 and a signal corresponding to the denomination of the note is sent to the sorter so that the German 50 DM notes may be separated from the German 100 DM notes at the sorter.

I claim:

1. In a machine for counting money in the form of paper currency notes of different sizes as to width and/or length, an apparatus comprising a housing housed within the machine, a plate mounted in the housing past which each note is moved, the plate having a rear end portion extending in a first direction along a plane that is substantially parallel to the plate, a front end portion across from said rear end portion and extending in said first direction, a first side portion extending in a second direction which is substantially perpendicular to said first direction and is a direction of conveyance of each note over the plate, and a second side portion across from said first side portion and extending in said second direction, means for conveying each note over the plate, sensor means positioned along the plate for sensing the length and width of each note and for initiating a signal indicating the length and width of each note, the sensor means including a plurality of LED sensor pairs at said first side portion and extending in said first direction and a plurality of sensor pairs at said second side portion and extending in said first direction for sensing the length of each note, a plurality of LED sensor pairs at said rear end portion and extending in said second direction for sensing the width of each note, and detector means, which is spaced apart from the width sensor pairs in said second direction, for detecting the trailing edge of each note, whereby the size of each note is determined by a number of the length sensor pairs and the width sensor pairs which sense the note.

2. A machine for counting money in the form of paper currency notes of different sizes as to width and/or length, comprising a housing, a plate mounted in the housing past which each note is moved, the plate having a rear end portion extending in a first direction along a plane that is substantially parallel to the plate, a front end portion across from said rear end portion and extending in said first direction, a first side portion extending in a second direction which is substantially perpendicular to said first direction and is a direction of conveyance of each note over the plate, and a second side portion across from said first side portion and extending in said second direction, means for conveying each note over the plate, sensor means positioned along the plate for sensing the length and width of each note and for initiating a signal indicating the length and width of each note, the sensor means including a plurality of LED sensor pairs at said first side portion and extending in said first direction and a plurality of sensor pairs at said second side portion and extending in said first direction for sensing the length of each note, a plurality of LED sensor pairs at said rear end portion and extending in said second direction for sensing the width of each note, and detector means, which is spaced apart from the width sensor pairs in said second direction, for detecting the trailing edge of each note, whereby the size of each note is determined by a number of the length sensor pairs and the width sensor pairs which sense the note.

3. A document size detection device for detecting the size of documents comprising a housing, a plate mounted in the housing, the plate having a rear end portion extending in a first direction along a plane that is substantially parallel to the plate, a front end portion across from said rear end portion and extending in said first direction, a first side portion extending in a second direction which is substantially perpendicular to said first direction and is a direction of conveyance of each document over the plate, and a second side portion across from said first side portion and extending in said second direction, means for conveying a document over the plate, sensor means positioned along the plate for sensing the length and width of each document and for initiating a signal indicating the length and width of each document, the sensor means including a plurality of LED sensor pairs at said first side portion and extending in said first direction and a plurality of sensor pairs at said second side portion and extending in said first direction for sensing the length of each document, a plurality of LED sensor pairs at said rear end portion and extending in said second direction for sensing the width of each document, and detector means, which is spaced apart from the width sensor pairs in said second direction, for detecting the trailing edge of each document, whereby the size of each document is determined by a number of the length sensor pairs and the width sensor pairs which sense the document.

* * * * *